(12) United States Patent
Ikeda et al.

(10) Patent No.: US 9,112,641 B2
(45) Date of Patent: Aug. 18, 2015

(54) TRANSMISSION DEVICE AND TRANSMISSION METHOD THEREOF, AND RECEPTION DEVICE

(75) Inventors: Tamotsu Ikeda, Tokyo (JP); Takuya Okamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 13/822,497

(22) PCT Filed: Oct. 11, 2011

(86) PCT No.: PCT/JP2011/073317
§ 371 (c)(1),
(2), (4) Date: Mar. 12, 2013

(87) PCT Pub. No.: WO2012/053391
PCT Pub. Date: Apr. 26, 2012

(65) Prior Publication Data
US 2013/0170570 A1   Jul. 4, 2013

(30) Foreign Application Priority Data
Oct. 19, 2010  (JP) ................. 2010-234405

(51) Int. Cl.
*H04J 11/00*   (2006.01)
*H04L 5/00*   (2006.01)
(Continued)

(52) U.S. Cl.
CPC ............ *H04L 5/0001* (2013.01); *H04H 20/33* (2013.01); *H04H 20/42* (2013.01); *H04H 60/73* (2013.01);
(Continued)

(58) Field of Classification Search
CPC . H04L 5/0001; H04L 27/2626; H04L 5/0053; H04L 5/0092; H04L 5/0007; H04H 20/42; H04H 20/33; H04H 60/73; H04N 21/6112; H04N 21/2362; H04N 21/631; H04N 21/234327
See application file for complete search history.

(56) References Cited

U.S. PATENT DOCUMENTS

2002/0001350 A1* 1/2002 Wu et al. ................ 375/240.26
2003/0103446 A1   6/2003 Negishi et al.
(Continued)

FOREIGN PATENT DOCUMENTS

JP    4062317 B2    3/2008
JP    4352701 B2    10/2009
WO   WO 02/17524 A1   2/2002

OTHER PUBLICATIONS

U.S. Appl. No. 13/823,123, filed Mar. 14, 2013, Ikeda, et al.
(Continued)

*Primary Examiner* — Jung-Jen Liu
(74) *Attorney, Agent, or Firm* — Hazuki International, LLC

(57) ABSTRACT

The present invention relates to a transmission device that enables transmission and reception of connected transmission channels in a 13-segment format and a transmission method of the transmission device, and to a reception device. The transmission device transmits connected transmission information indicating that connected transmission of a plurality of transmission channels is being performed, the connected transmission information including a field that specifies the modulation method type of each of three or more layers of layered transmission that can be performed on at least one of the transmission channels in the three or more layers.
The reception device receives the connected transmission information transmitted by the transmission device. The present invention can be applied to transmission devices that transmit terrestrial digital broadcast signals, for example.

19 Claims, 13 Drawing Sheets

(51) Int. Cl.
*H04H 20/42* (2008.01)
*H04N 21/61* (2011.01)
*H04H 20/33* (2008.01)
*H04H 60/73* (2008.01)
*H04N 21/2343* (2011.01)
*H04N 21/2362* (2011.01)
*H04N 21/63* (2011.01)
*H04L 27/26* (2006.01)

(52) U.S. Cl.
CPC ............ *H04L 5/0007* (2013.01); *H04L 5/0053* (2013.01); *H04L 5/0092* (2013.01); *H04N 21/2362* (2013.01); *H04N 21/234327* (2013.01); *H04N 21/6112* (2013.01); *H04N 21/631* (2013.01); *H04L 27/2626* (2013.01)

(56) References Cited

U.S. PATENT DOCUMENTS

| | | | | |
|---|---|---|---|---|
| 2007/0230329 A1* | 10/2007 | Hayashi et al. | ............... | 370/210 |
| 2007/0288832 A1* | 12/2007 | Adachi | ......................... | 714/780 |
| 2008/0095255 A1* | 4/2008 | Tanaka et al. | ................. | 375/260 |
| 2008/0101216 A1* | 5/2008 | Tanaka et al. | ................. | 370/210 |
| 2008/0192845 A1* | 8/2008 | Aizawa et al. | ................ | 375/260 |
| 2009/0296843 A1* | 12/2009 | Gu et al. | ....................... | 375/262 |
| 2011/0069787 A1* | 3/2011 | Lee et al. | ...................... | 375/322 |

OTHER PUBLICATIONS

International Search Report issued Nov. 22, 2011 in PCT/JP2011/073317.

Ministry of Internal Affairs and Communications, http://www.soumu.go.jp/main_content/000028353.pdf, Apr. 27, 2009, pp. 1-84-1-92 and 1-131 with cover pages.

Ministry of Internal Affairs and Communications, http://www.soumu.go.jp/main_sosiki/joho_tsusin/policyreports/joho_tsusin/housou_system/pdf/081128_1_si16-3-1.pdf, Nov. 28, 2008, pp. 1-16 with cover page.

Service Information for Digital Broadcasting System, Association of Radio Industries and Businesses, http://www.arib.or.jp/english/html/overview/doc/2-STD-B10v4_8.pdf, Apr. 26, 2010, pp. 73-76, 105-107, 167-168 with cover page.

* cited by examiner

FIG. 6

| DATA STRUCTURE | NUMBER OF BITS | BIT STRING NOTATION |
|---|---|---|
| connected_transmission_descriptor () { | | |
|   descriptor_tag | 8 | uimsbf |
|   descriptor_length | 8 | uimsbf |
|   connected_transmission_group_id | 16 | uimsbf |
|   segment_type | 2 | bslbf |
|   modulation_type_A | 2 | bslbf |
|   modulation_type_B | 2 | bslbf |
|   modulation_type_C | 2 | bslbf |
|   for (i=0;i<N;i++){ | | |
|     additional_connected_transmission_info | 8 | uimsbf |
|   } | | |
| } | | |

FIG. 7

| SEGMENT FORMAT TYPE | DESCRIPTION |
|---|---|
| 00 | ONE-SEGMENT |
| 01 | THREE-SEGMENT |
| 10 | 13-SEGMENT |
| 11 | TMCC SIGNAL REFERENCE |

FIG. 8

| MODULATION METHOD TYPE | DESCRIPTION |
|---|---|
| 00 | DIFFERENTIAL MODULATION |
| 01 | SYNCHRONOUS MODULATION |
| 10 | RESERVED FOR FUTURE USE |
| 11 | TMCC SIGNAL REFERENCE |

FIG. 9

| DATA STRUCTURE | NUMBER OF BITS | BIT STRING NOTATION |
|---|---|---|
| network_information_section() { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     network_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | uimsbf |
|     for(i=0;i<N;i++){ | | |
|         descriptor() | | |
|     } | | |
|     reserved_future_use | 4 | bslbf |
|     transport_stream_loop_length | 12 | uimsbf |
|     for(i=0;i<N;i++){ | | |
|         transport_stream_id | 16 | uimsbf |
|         original_network_id | 16 | uimsbf |
|         reserved_future_use | 4 | bslbf |
|         transport_descriptors_length | 12 | uimsbf |
|         for(j=0;j<N;j++){ | | |
|             descriptor() | | |
|         } | | |
|     } | | |
|     CRC_32 | 32 | rpchof |
| } | | |

TRANSMISSION DEVICE AND TRANSMISSION METHOD THEREOF, AND RECEPTION DEVICE

TECHNICAL FIELD

The present invention relates to transmission devices and transmission methods thereof, and to reception devices. More particularly, the present invention relates to a transmission device that enables transmission and reception of connected transmission channels in a 13-segment format, and a transmission method thereof, and to a reception device.

BACKGROUND ART

The applicant has suggested a method of connecting data of transmission channels in the direction of a frequency axis and transmitting the data while the guard band of each channel is removed in terrestrial digital broadcasting (see Patent Documents 1 and 2, for example). This connected transmission method is also specified in ISDB-Tsb, which is the transmission method standard in terrestrial digital sound broadcasting.

By this connected transmission method, broadcasting can be performed with higher frequency usage efficiency. On the receiving side, even if channel switching is performed between transmission channels subjected to connected transmission, the synchronizing timing set in the transmission channel received prior to the switching can also be used in the transmission channel to be received after the switching. Accordingly, the reception device can simplify the synchronization regenerating operation for demodulation, and shorten the channel switching time.

Meanwhile, terrestrial analog television broadcasting will end in July 2011, as the transition to terrestrial digital television broadcasting is in progress. Multimedia broadcasting for mobile terminals is planned by using part of the frequency band not to be used after the end of terrestrial analog broadcasting, or more specifically, by using the frequency band from 207.5 to 222 MHz. In the 14.5 MHz band from 207.5 to 222 MHz, up to 33 segments that are equivalent to two transmission channels in a 13-segment format for one channel of terrestrial digital television broadcasting, and seven transmission channels in a one-segment format can be secured.

CITATION LIST

Patent Documents

Patent Document 1: Japanese Patent No. 4062317
Patent Document 2: Japanese Patent No. 4352701

SUMMARY OF THE INVENTION

Problems to be Solved by the Invention

Efficient band use is also preferred in the band from 207.5 to 222 MHz for multimedia broadcasting for mobile terminals. To efficiently use the band, up to 33 segments are preferably connected and transmitted.

In accordance with the existing standards such as ISDB-Tsb and ISDB-T, however, transmission channels in the 13-segment format cannot be connected and transmitted.

The present invention has been made in view of those circumstances, and is to enable transmission and reception of connected transmission channels in the 13-segment format.

Solutions to Problems

A transmission device according to a first aspect of the present invention transmits connected transmission information indicating that connected transmission of transmission channels is being performed, the connected transmission information including a field that specifies the modulation method type of each of three or more layers of layered transmission that can be performed on at least one of the transmission channels in the three or more layers.

A transmission method of the transmission device according to the first aspect of the present invention transmits connected transmission information indicating that connected transmission of transmission channels is being performed, the connected transmission information including a field that specifies the modulation method type of each of three or more layers of layered transmission that can be performed on at least one of the transmission channels in the three or more layers.

In the first aspect of the present invention, at least one of transmission channels can be subjected to layered transmission in three or more layers, and connected transmission information that includes a field specifying the modulation method type of each of the three or more layers, and indicates that connected transmission of the transmission channels is being performed is transmitted.

A reception device according to a second aspect of the present invention receives connected transmission information indicating that connected transmission of transmission channels is being performed, the connected transmission information including a field that specifies the modulation method type of each of three or more layers of layered transmission that can be performed on at least one of the transmission channels in the three or more layers.

In the second aspect of the present invention, at least one of transmission channels can be subjected to layered transmission in three or more layers, and connected transmission information that includes a field specifying the modulation method type of each of the three or more layers, and indicates that connected transmission of the transmission channels is being performed is received.

A transmission device according to a third aspect of the present invention transmits connected transmission information indicating that connected transmission of transmission channels is being performed, the connected transmission information including a field that specifies the modulation method of each of three or more layers of layered transmission that can be performed on at least one of the transmission channels in the three or more layers.

In the third aspect of the present invention, at least one of transmission channels can be subjected to layered transmission in three or more layers, and connected transmission information that includes a field specifying the modulation method of each of the three or more layers, and indicates that connected transmission of the transmission channels is being performed is transmitted.

Effects of the Invention

According to the first and third aspects of the present invention, transmission data in the 13-segment format can be connected and transmitted.

According to the second aspect of the present invention, signals transmitted by connecting transmission data in the 13-segment format can be received.

BRIEF DESCRIPTION OF DRAWINGS

FIG. 6 is a diagram showing the data structure of a connected transmission descriptor that realizes the connected transmission method according to the present invention.

FIG. 7 is a diagram for explaining the connected transmission descriptor in detail.

FIG. 8 is a diagram for explaining the connected transmission descriptor in detail.

FIG. 9 is a diagram showing the data structure of an NIT in which the connected transmission descriptor shown in FIG. 6 is written.

MODE FOR CARRYING OUT THE INVENTION

The following is a description of modes (hereinafter referred to as embodiments) for carrying out the present invention. Explanation will be made in the following order.
1. Description of a transmission method according to the present invention
2. Embodiment of a transmission device that performs transmission by the transmission method according to the present invention
3. Embodiment of a reception device that receives broadcast signals transmitted by the transmission method according to the present invention
<1. Description of a Transmission Method According to the Present Invention>
[Transmission Method According to the Present Invention]

This specification suggests a transmission method for improving frequency usage efficiency in the band from 207.5 to 222 MHz, in which multimedia broadcasting for mobile terminals is performed, a transmission device that performs transmission by the transmission method, and a reception device that receives signals transmitted by the transmission method.

In the 14.5 MHz bandwidth from 207.5 to 222 MHz, up to 33 segments can be secured. Here, one segment is an approximately 429 KHz band, which is a data unit obtained by dividing the bandwidth of one channel (6 MHz) of conventional analog terrestrial broadcasting by 14, and is a fundamental band in digital terrestrial broadcasting. In view of this, the transmission method according to the present invention enables transmission (connected transmission) of up to 33 connected segments of transmission data of respective channels without a guard band.

The transmission method according to the present invention enables connected transmission of up to 33 segments of arbitrary combinations of transmission data in a 13-segment format, a one-segment format, or a three-segment format in the 14.5 MHz bandwidth. Here, transmission data contains at least one piece of data in the 13-segment format.

Figure 1:
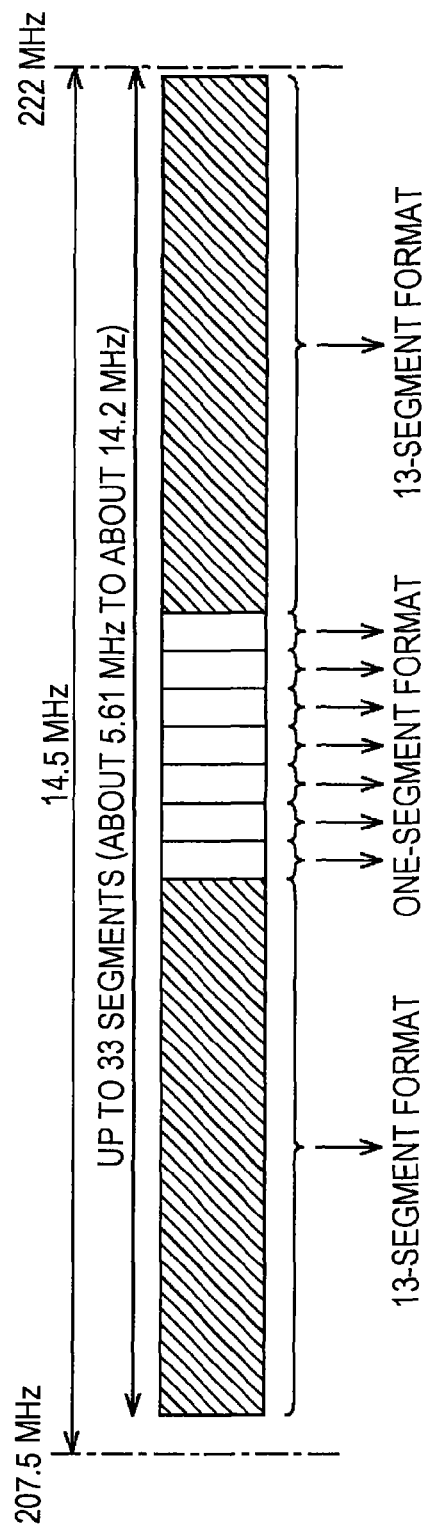
FIG. 1 is a diagram for explaining a connected transmission method according to the present invention.
Figure 2:
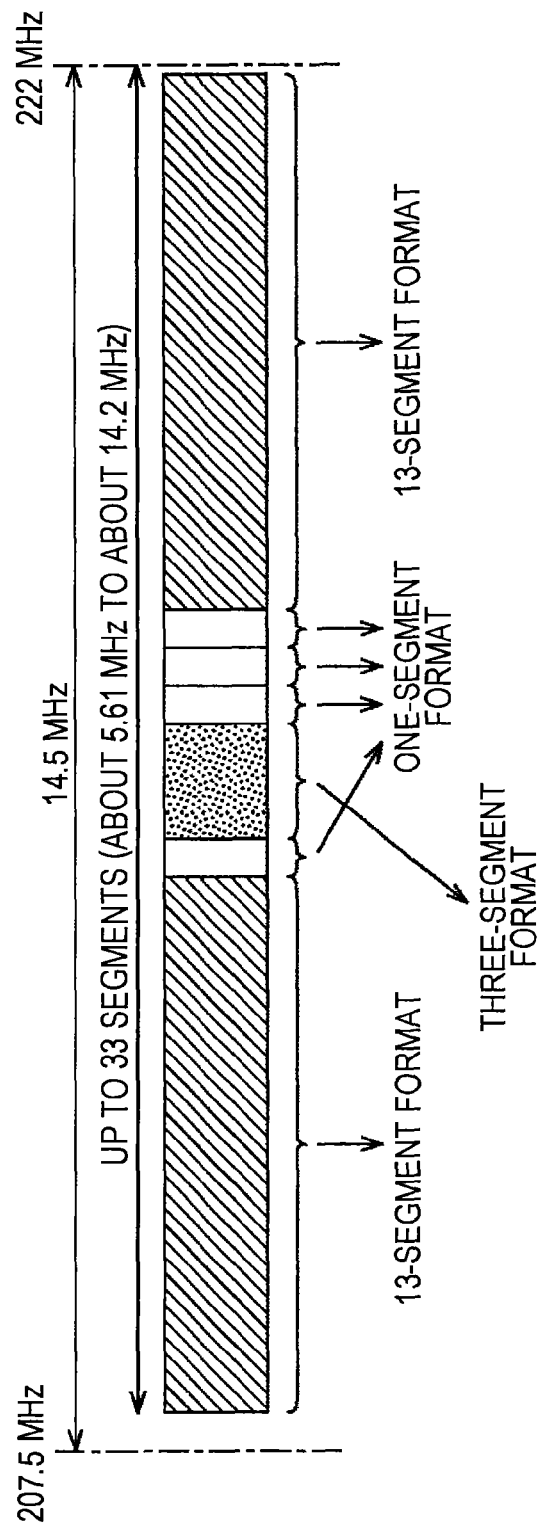
FIG. 2 is a diagram for explaining the connected transmission method according to the present invention.

For example, as shown in FIG. 1, the transmission device can perform connected transmission of a total of 33 segments of transmission data formed by connecting two pieces of transmission data in the 13-segment format and seven pieces of transmission data in the one-segment format. Alternatively, as shown in FIG. 2, the transmission device can perform connected transmission of a total of 33 segments of data formed by connecting two pieces of transmission data in the 13-segment format, four pieces of transmission data in the one-segment format, and one piece of transmission data in the three-segment format, for example.

Figure 3:
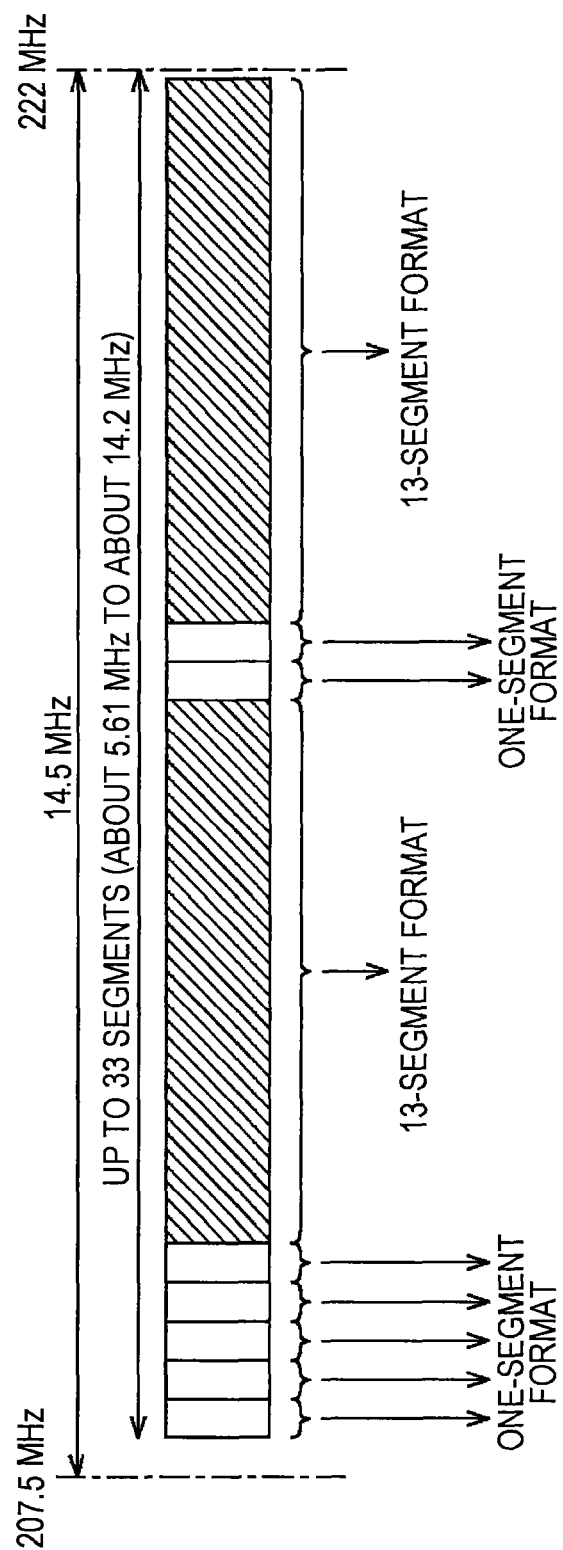
FIG. 3 is a diagram for explaining the connected transmission method according to the present invention.

It should be noted that transmission data in the one-segment format, the three-segment format, and the 13-segment format can be arbitrarily assigned to frequency bands. Accordingly, a combination of two pieces of transmission data in the 13-segment format and seven pieces of transmission data in the one-segment format, which is the same as the combination shown in FIG. 1, can also be assigned as shown in FIG. 3, for example.

Since not all the 33 segments must be used, one piece of transmission data in the 13-segment format and one piece of transmission data in the one-segment format may be connected, and only a total of 14 segments may of course be transmitted.

Transmission data in the 13-segment format is compliant with the transmission format for terrestrial digital television broadcasting, which is standardized as ISDB-T (Integrated Services Digital Broadcasting-Terrestrial). Transmission data in the one-segment format and the three-segment format are compliant with the transmission format for terrestrial digital sound broadcasting, which is standardized as ISDB-Tsb (ISDB-T sound broadcasting). Accordingly, the circuit configurations of the transmission device and the reception device can be the same between terrestrial digital television broadcasting and terrestrial digital sound broadcasting.

As the modulation method for transmission data (transmission signals), OFDM (Orthogonal Frequency Division Multiplexing) is used in terrestrial digital television broadcasting and terrestrial digital sound broadcasting. By OFDM, digital modulation such as PSK (Phase Shift Keying) or QAM (Quadrature Amplitude Modulations) is performed by providing a large number of orthogonal subcarriers (subcarrier waves) in the transmission band and assigning data to the amplitudes and phases of the respective subcarriers.
[Transmission Data in the 13-Segment Format]

Figure 4:
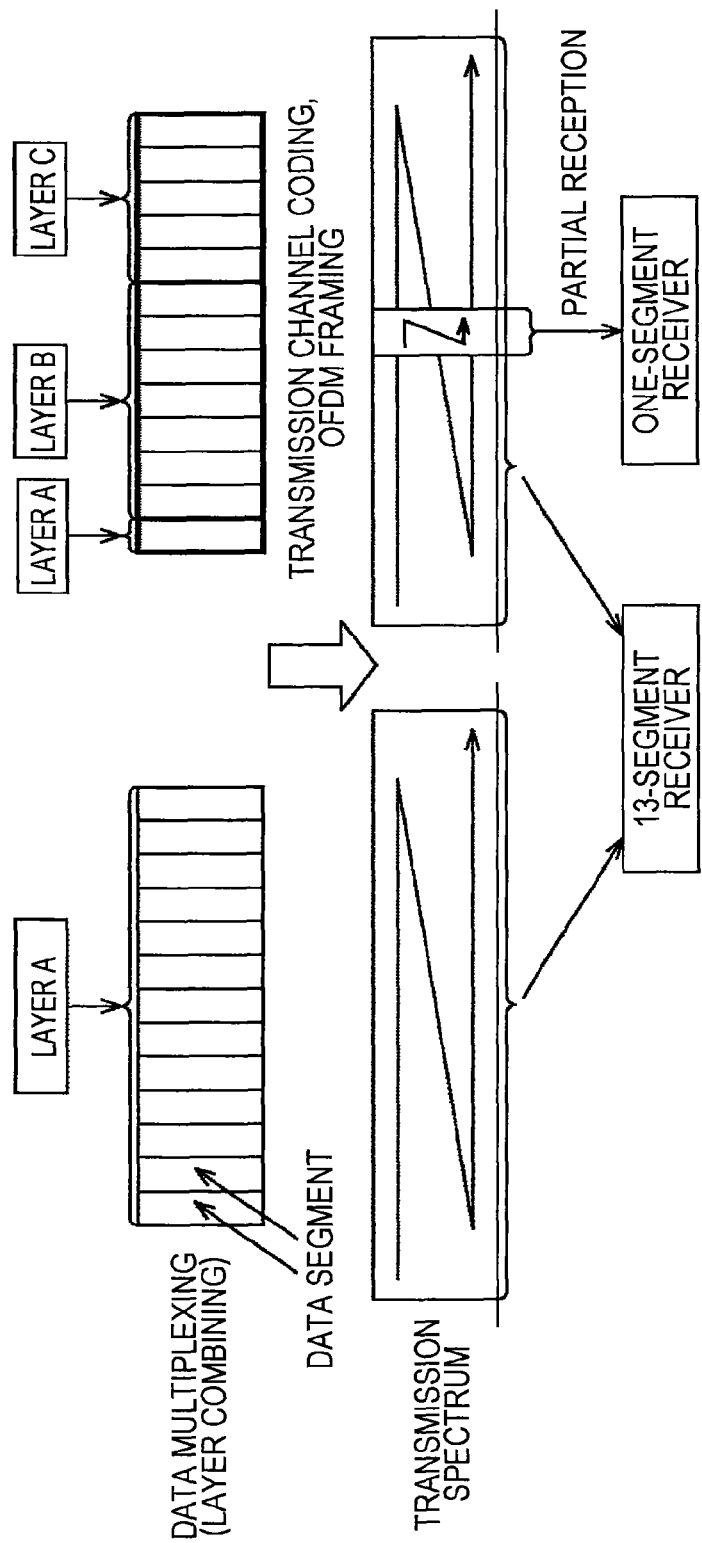
FIG. 4 is a diagram for explaining transmission data in a 13-segment format.

Referring now to FIG. 4, transmission data in the 13-segment format is described.

In the 13-segment format, transmission data of one channel is formed with a total of 13 OFDM segments. An OFDM segment has an OFDM frame formed by adding pilot signals (SP, CP) to a data segment that is a data unit of one segment. All the 13 OFDM segments are collectively transformed into OFDM transmission signals through an IFFT.

In the 13-segment format, the 13 OFDM segments are formed in layers, and can be simultaneously transmitted, which is layered transmission. Each layer is formed with one or more OFDM segments, and a different carrier modulation method, a different intra coding rate, and a different parameter such as a time interleave length can be set for each layer. According to ISDB-T, layered transmission of up to three layers, which are a layer A, a layer B, and a layer C, can be performed. Accordingly, layered transmission of at least three layers can be performed by this transmission method.

As for the one OFDM segment at the center of the 13 OFDM segments, frequency interleaving is performed in the segment, so that some of television signals can be received (partial reception) by using a one-segment receiver (a digital sound broadcasting receiver).

[Transmission Data in the One-Segment Format and the Three-Segment Format]

Figure 5:
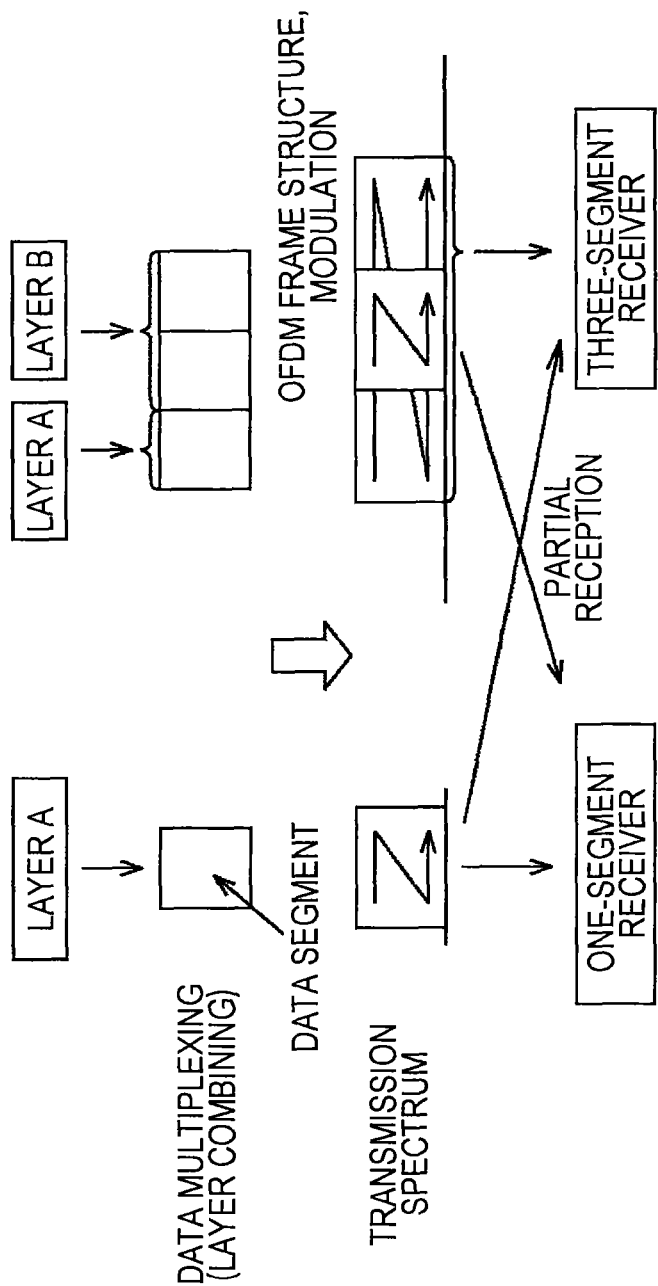
FIG. 5 is a diagram for explaining transmission data in a one-segment format and a three-segment format.

Referring now to FIG. 5, transmission data in the one-segment format and the three-segment format is described.

Transmission data in the one-segment format is formed with one OFDM segment. Transmission data in the one-segment format is formed only with one layer (the layer A).

Transmission data in the three-segment format is formed with three OFDM segments. In the three-segment format, two-layered transmission can be performed, with different layers being formed by the one OFDM segment at the center in the frequency direction and the two of the upper and lower OFDM segments adjacent to the center OFDM segment in the frequency direction. Specifically, the one OFDM segment at the center is set as the layer A, and the two of the upper and lower OFDM segments adjacent to the center OFDM segment are set as the layer B. The parameters can be made to differ between the layer A and the layer B to be transmitted. In this case, as for the one OFDM segment at the center, frequency interleaving is performed only in the segment, as in the case of the above described 13-segment format. Accordingly, partial reception can be performed even by a receiver that has a limited function to receive only transmission signals in the one-segment format.

As described above, according to this transmission method, transmission data in the 13-segment format is compliant with ISDB-T, and transmission data in the one-segment format and the three-segment format is compliant to ISDB-Tsb, so as to be suitable for both terrestrial digital television broadcasting and terrestrial digital sound broadcasting.

According to ISDB-Tsb, PSI/SI (Program Specific Information/Service Information), which is auxiliary information for selecting a show and obtaining information about the show, is included in a transport stream and is transmitted. The PSI/SI used in ISDB-Tsb is defined in MPEG-2 Systems and ARIB STD-B10.

[Connected Transmission Descriptor, Connected_Transmission_Descriptor( )]

In MPEG-2 Systems and ARIB STD-B10, a NIT (Network Information Table) is defined as one piece of PSI/SI. This NIT defines information that associates transmission channel information such as modulating frequencies with broadcast shows. For example, the NIT contains a terrestrial delivery system descriptor [terrestrial_delivery_system_descriptor( )] that describes physical conditions for a terrestrial transmission channel, and a service list descriptor [service_list_descriptor( )] that describes a list of programmed channels and the types of the programmed channels.

As a descriptor to be included in this NIT, a connected transmission descriptor [connected_transmission_descriptor( )] that describes the physical conditions in terrestrial transmission channels at the time of connected transmission is defined as shown in FIG. 6.

Specifically, FIG. 6 shows the data structure of a connected transmission descriptor [connected_transmission_descriptor( )] as connected transmission information that describes the physical conditions for connected transmission through terrestrial transmission channels, to realize the connected transmission method of connecting and transmitting up to 33 segments according to the present invention.

The connected transmission descriptor [connected_transmission_descriptor( )] is a descriptor that can identify the group of transport streams to be subjected to connected transmission, and list the transport streams in this group. This connected transmission descriptor [connected_transmission_descriptor( )] is written in a TS loop in the NIT.

In the field of [descriptor_tag], a tag for distinguishing this descriptor from other identifiers is written.

In the field of [descriptor_length], the total number of bytes of the data that follows is written.

In the field of [connected_transmission_group_id], a connected transmission group ID for identifying the group of transport streams being subjected to connected transmission is written. When all the transport streams of the total of 33 segments are connected, for example, the same connected transmission group ID (such as "0") is set for all the transport streams.

In the field of [segment_type], a segment format type is written to indicate which format among the one-segment format, the three-segment format, and the 13-segment format, the transport streams indicated by the connected transmission descriptor are in. The field of [segment_type] is 2-bit information. As shown in FIG. 7, "00" represents the one-segment format, "01" represents the three-segment format, "10" represents the 13-segment format, and "11" represents a determination to be made by referring to a TMCC signal.

In the field of [modulation_type_A], a modulation method type is written. The field of [modulation_type_A] indicates the modulation method type of the data in the entire segment in the case of the one-segment format, and indicates the modulation method type of the layer A in the cases of the three-segment format and the 13-segment format.

The modulation method type is a differential modulation method or a synchronous modulation method. The differential modulation method is DQPSK, and the synchronous modulation method is QPSK, 16-QAM, or 64-QAM. The modulation method type indicating a differential modulation method or a synchronous modulation method is a broad category of modulation method, and DQPSK, QPSK, 16-QAM, and 64-QAM are under narrow categories of modulation method.

The field of [modulation_type_A] is 2-bit information. As shown in FIG. 8, "00" represents a differential modulation method (DQPSK), and "01" represents a synchronous modulation method (QPSK, 16-QAM, or 64-QAM). Further, "11" represents a determination to be made by referring to a TMCC signal, and "10" is reserved for future use.

In the field of [modulation_type_B], the modulation method type of the layer B in the three-segment format and the 13-segment format is written. The field of [modulation_type_B] is void in the case of the one-segment format. The field of [modulation_type_B] is 2-bit information, and functions in the same manner as the field of [modulation_type_A] shown in FIG. 8.

In the field of [modulation_type_C], the modulation method type of the layer C in the 13-segment format is written. The field of [modulation_type_C] is void in the cases of the one-segment format and the three-segment format. The field of [modulation_type_C] is 2-bit information, and functions in the same manner as [modulation_type_A] shown in FIG. 8.

In the field of [additional_connected_transmission_info], complementary information specified in the business regulations is written.

The above is the data structure of the connected transmission descriptor that is compliant with ISDB-T and describes the physical conditions for connected transmission according to this transmission method compatible with layered transmission using up to three layers. To cope with layered transmission using up to four layers, a field of [modulation_type_D] describing the modulation method type of the fourth layer (a layer D) is provided after the field of [modulation_type_C]. Likewise, it is possible to cope with layered transmission using five or more layers.

When transmission is performed only with one layer (only with the layer A), the layer B and the layer C do not exist. When transmission is performed with two layers, the layer C does not exist. In the field(s) for describing the modulation method type(s) of a layer (layers) that does not exist, information indicating that transmission with the field(s) is not to be performed may be written. Specifically, the information indicating that transmission with the layer(s) may be represented by "10". When transmission is to be performed with one layer, for example, "10" may be written into the fields of [modulation_type_B] and [modulation_type_C]. When transmission is to be performed with two layers, "10" may be written into the field of [modulation_type_C].

[Data Structure of the NIT]

FIG. 9 shows the data structure of the NIT in which the above described connected transmission descriptor [connected_transmission_descriptor( )] is written.

The field of [table_id] is an identifier indicating what this network information section indicates. When the NIT is an NIT of its own network, a value of "0x40" is written. When the NIT is an NIT of another network, a value of "0x41" is written. The NIT may be an NIT showing information about its own network, or may be an NIT showing information about another network.

The field of [section_syntax_indicator] is an identifier for identifying a section syntax indicator, and always has a value of "1".

The field of [reserved_future_use] is an extended area reserved for specifying some information in the future. The field of [reserved] is a reserved area.

The field of [section_length] specifies the number of bytes in the section from the point immediately after the section length field to the end of the section including a CRC (Cyclic Redundancy Check).

The field of [network_id] is an ID for identifying the network indicated by the NIT.

The field of [version_number] shows the version number of a sub table. The field of [current_next_indicator] indicates that the sub table when the value in this field is "1". When the value is "0", this field is an identifier indicating that the transmitted sub table is not to be used, and the next sub table is to be used.

The field of [section_number] shows a section number. The section number of the first section in the sub table is "0x00". This section number is incremented by "1" every time a section including the same [table_id] and [network_id] is added.

The field of [last_section_number] shows the section number of the last section in the sub table to which the section belongs, or the section having the largest section number.

The field of [network_descriptors_length] indicates the total number of bytes in the loop of the network descriptor (descriptor( )) that follows. In the loop, a network descriptor, descriptor( ) is written.

The field of [transport_stream_loop_length] indicates the total number of bytes in the transport stream loop that ends immediately before the first byte of CRC_32.

A TS loop then follows.

The field of [transport_stream_id] in the TS loop is an ID for distinguishing this transport stream from the other multiplexed ones in the delivery system.

The field of [original_network_id] is an ID indicating the [network_id] of the original network.

The field of [transport_descriptors_length] is an identifier indicating the total number of bytes in the loop of the transport descriptor (descriptor( )) that follows. In this transport descriptor, the above described connected transmission descriptor [connected_transmission_descriptor( )], a terrestrial delivery system descriptor [terrestrial_delivery_system_descriptor( )], a service list descriptor [service_list_descriptor( )], and the like are written.

The field of [CRC_32] is an error code that indicates a CRC and contains such a CRC value that the register output after the processing of the entire section becomes "0".

As described above, the connected transmission descriptor [connected_transmission_descriptor( )] has a field that can define the 13-segment format as one of segment formats for transmission channels to be subjected to connected transmission. With a transmission channel in the 13-segment format, layered transmission using three or more layers can be performed, and the connected transmission descriptor [connected_transmission_descriptor( )] includes a field that identifies the modulation method type of each of the three or more layers (the layer A, the layer B, and the layer C).

The connected transmission descriptor [connected_transmission_descriptor( )] links transmission channels (transport streams) to be subjected to the connected transmission. As the connected transmission descriptor is contained in MPEG-2 Systems control information, transport streams subjected to connected transmission can be linked, and be sent to a reception device.

Accordingly, by analyzing the connected transmission descriptor contained in the NIT, the reception device can determine whether an upper adjacent segment (an adjacent segment on the high frequency side) subjected to connected transmission exists in the segment containing the currently received transport stream, and determine whether a lower adjacent segment (an adjacent segment on the low frequency side) subjected to connected transmission exists in the segment. Further, it is possible to determine whether the modulation method type of the upper or lower adjacent segment is a synchronous modulation method or a differential modulation method. When the modulation method type of the segment containing the currently received transport stream is a synchronous modulation method, the reception device can estimate transmission characteristics by using a SP signal contained in the upper and lower adjacent segments. As transmission characteristics can be estimated by using an SP signal in an adjacent segment, the transmission characteristics of a sub carrier at the end portion in the frequency direction of the segment can be accurately estimated, ad more precise waveform equalization can be performed.

When an adjacent transmission channel (a transport stream) subjected to connected transmission is in the three-segment format, the layer B in the adjacent transmission channel is an adjacent segment, and if the modulation method type of the layer B is a synchronous modulation method, the transmission characteristics can be estimated by using the SP signal.

When a transmission channel being received is in the three-segment format, a segment adjacent to the segment of the layer A is a segment of the layer B in its own transmission channel (a transport stream). The segments adjacent to a segment of the layer B are the segment of the layer A in its own transmission channel (a transport stream) and a segment of another transmission channel (another transport stream).

When switching transmission channels to be received, the reception device can obtain information indicating whether the transmission channel received prior to the switching and the transmission channel to be received after the switching have been subjected to connected transmission, by analyzing the connected transmission descriptor contained in the NIT. Where the transmission channel received prior to the switching and the transmission channel to be received after the switching have been subjected to connected transmission, the reception device can continue to use the synchronizing timing set in the transmission channel received prior to the switching, in the transmission channel to be received after the switching. Accordingly, the reception device can simplify the synchronization regenerating operation for demodulation, and can shorten the channel switching time.

<2. Embodiment of a Transmission Device>
[Example Structure of a Transmission Device]

Figure 10:
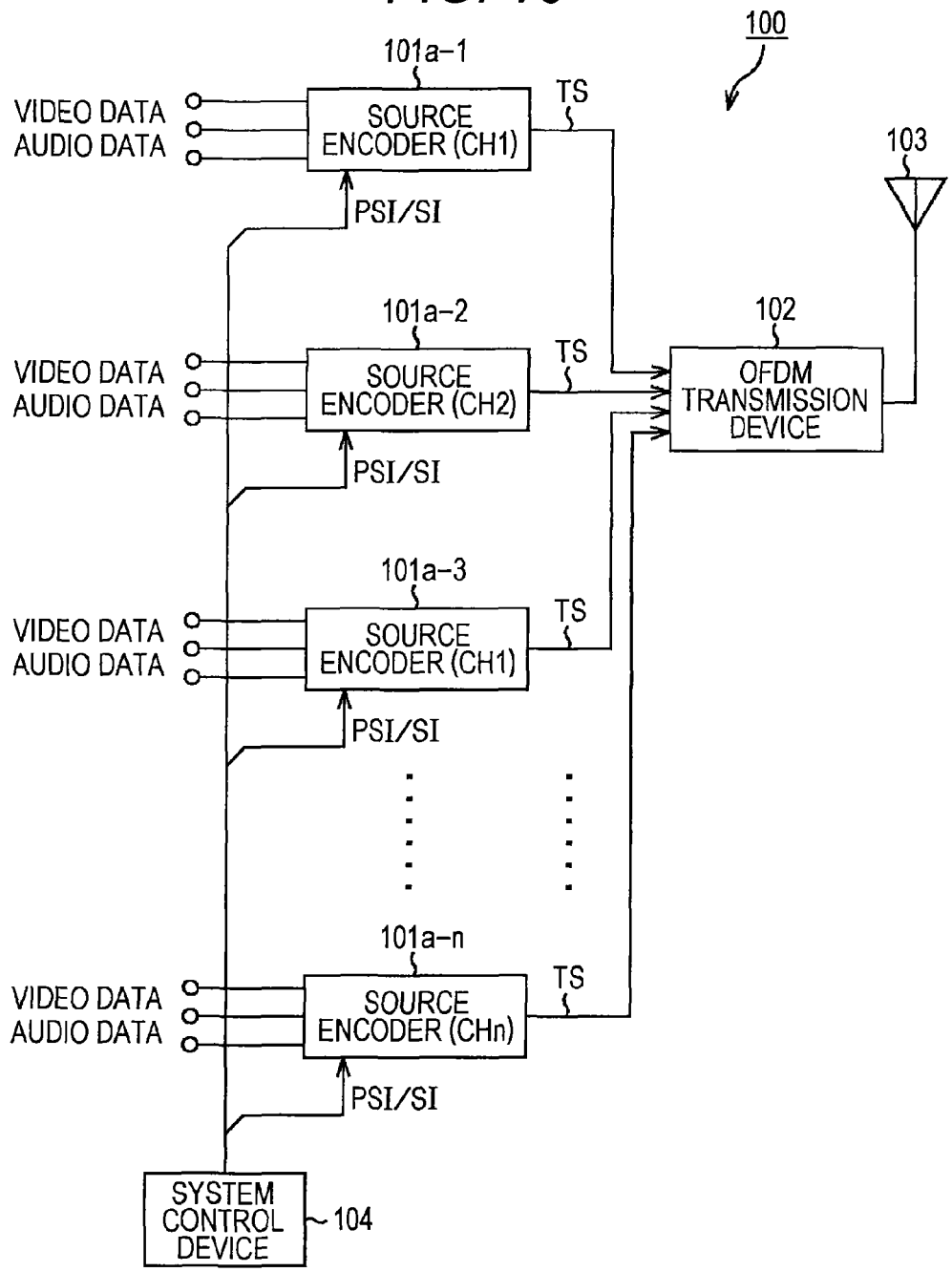
FIG. 10 is a block diagram showing an embodiment of a transmission device to which the present invention is applied.

FIG. 10 shows an example structure of a transmission device that connects and transmits transmission channels in the 13-segment format, the one-segment format, or the three-segment format by the connected transmission method according to the present invention. That is, FIG. 10 is a block diagram showing an embodiment of a transmission device to which the present invention is applied.

As shown in FIG. 10, the transmission device 100 includes source encoders 101a (101a-101 through 101a-n), an OFDM transmission device 102, an antenna 103, and a system control device 104.

Baseband video data, audio data, and the like are input to each source encoder 101a, and each source encoder 101a compresses and encodes the data by a technique such as MPEG-2 or the like, to generate program streams. Each source encoder 101a multiplexes the generated program streams, to generate a transport stream specified in MPEG-2 Systems. The respective transport streams output from the respective source encoders 101a correspond to respective transmission channels.

Control information (PSI/SI) such as an NIT generated by the system control device 104 is input to each source encoder 101a, and the respective source encoders 101a also incorporate the control information into the transportation streams, and perform multiplexing. The control information contains the above described connected transmission descriptor [connected_transmission_descriptor( )].

The OFDM transmission device 102 performs a transmission channel encoding operation on each of the transport streams input from the respective source encoders 101a, or on each transmission channel, and generates OFDM frames that are transmission frames formed with 204 OFDM symbols. The OFDM transmission device 102 synchronizes the OFDM symbols (the 204 OFDM symbols) generated for each transmission channel in the direction of the time axis, and multiplexes those OFDM symbols in the frequency direction. The OFDM transmission device 102 then performs a collective IFFT on the OFDM symbols multiplexed in the frequency direction, and performs OFDM.

Figure 11:
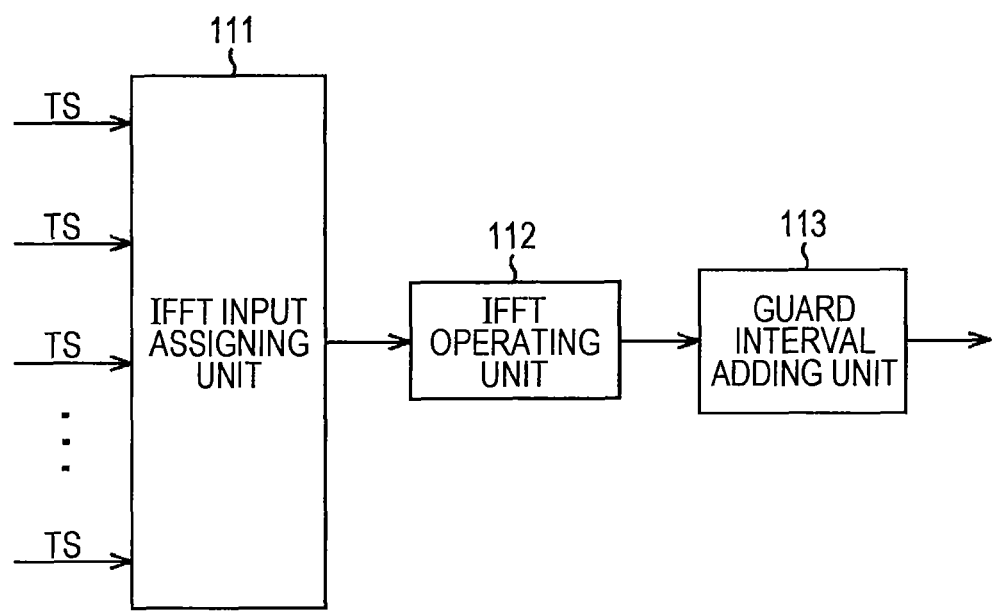
FIG. 11 is a block diagram showing an example structure of the OFDM transmission device.

As shown in FIG. 11, the OFDM transmission device 102 includes at least an IFFT input assigning unit 111, an IFFT operating unit 112, and a guard interval adding unit 113.

Error correction, interleaving, carrier modulation, and the like are performed, and data (TS) of the respective transmission channels formed in the OFDM frames is input to the IFFT input assigning unit 111. The IFFT input assigning unit 111 multiplexes the data of the respective channels in the frequency direction. The IFFT operating unit 112 collectively performs an inverse Fourier transform on multiplexed signals of n channels, to generate a time-domain baseband OFDM signal. The guard interval adding unit 113 adds a guard interval to the baseband OFDM signal supplied from the IFFT operating unit 112.

By performing the above described operation, the OFDM transmission device 102 can connect transmission channels. The transmitted waves of the transmission channels connected by the OFDM transmission device 102 are then emitted to the outside via the antenna 103.

[Flowchart of a Transmitting Operation]

Figure 12:
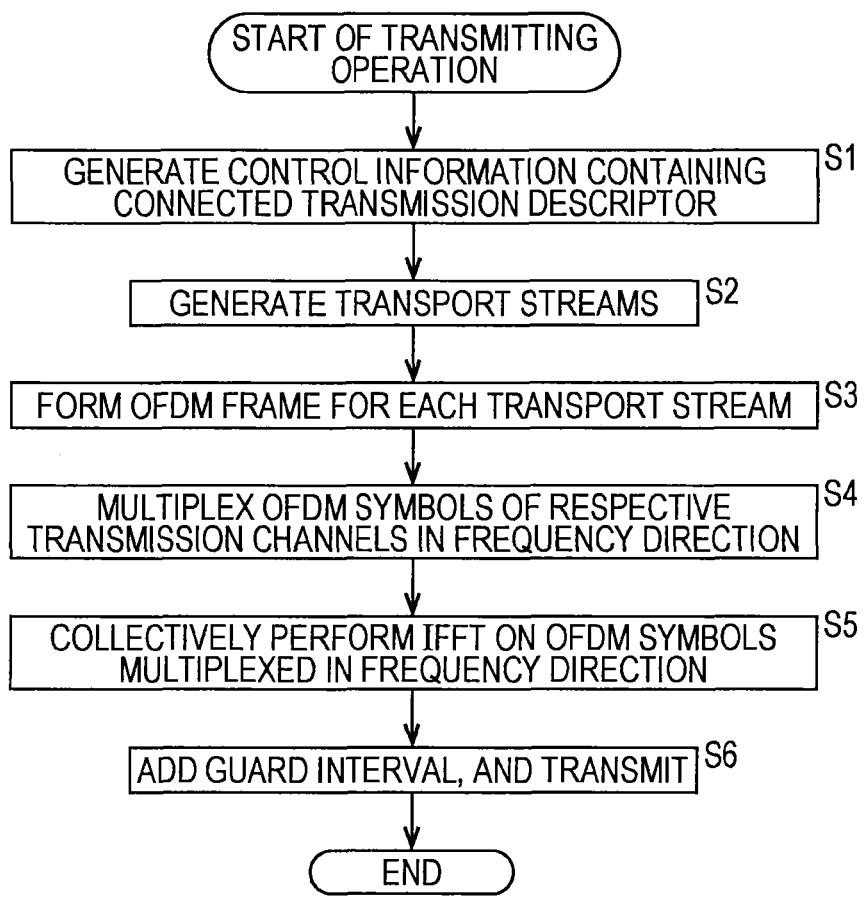
FIG. 12 is a flowchart for explaining a transmitting operation of the transmission device.

Referring now to the flowchart in FIG. 12, a transmitting operation of the transmission device 100 is described.

First, in step S1, the system control device 104 generates the control information (PSI/SI) containing the connected transmission descriptor [connected_transmission_descriptor( )], and supplies the control information to each source encoder 101a.

In step S2, each source encoder 101a generates a transport stream specified in MPEG-2 Systems. More specifically, each source encoder 101a multiplexes program streams of video data, audio data, and the like, to generate a transport stream corresponding to each transmission channel. At this point, the control information (PSI/SI) containing the connected transmission descriptor [connected_transmission_descriptor( )] is also multiplexed.

In step S3, the OFDM transmission device 102 generates an OFDM frame for each transport stream input from the respective source encoders 101a.

In step S4, the OFDM transmission device 102 synchronizes the OFDM symbols of each transmission channel in the direction of the time axis, and multiplexes those OFDM symbols in the frequency direction.

In step S5, the OFDM transmission device 102 performs a collective IFFT on the OFDM symbols multiplexed in the frequency direction, and generates a time-domain baseband OFDM signal.

In step S6, the OFDM transmission device 102 adds a guard interval to the time-domain baseband OFDM signal, and transmits the signal to the outside via the antenna 103. The operation then comes to an end.

<3. Embodiment of a Reception Device>
[Example Structure of a Reception Device]

Next, the structure of a reception device 200 that receives broadcast signals of terrestrial digital broadcasting transmitted from the above described transmission device 100 is described. In other words, FIG. 13 is a block diagram showing an embodiment of a reception device to which the present invention is applied.

Figure 13:
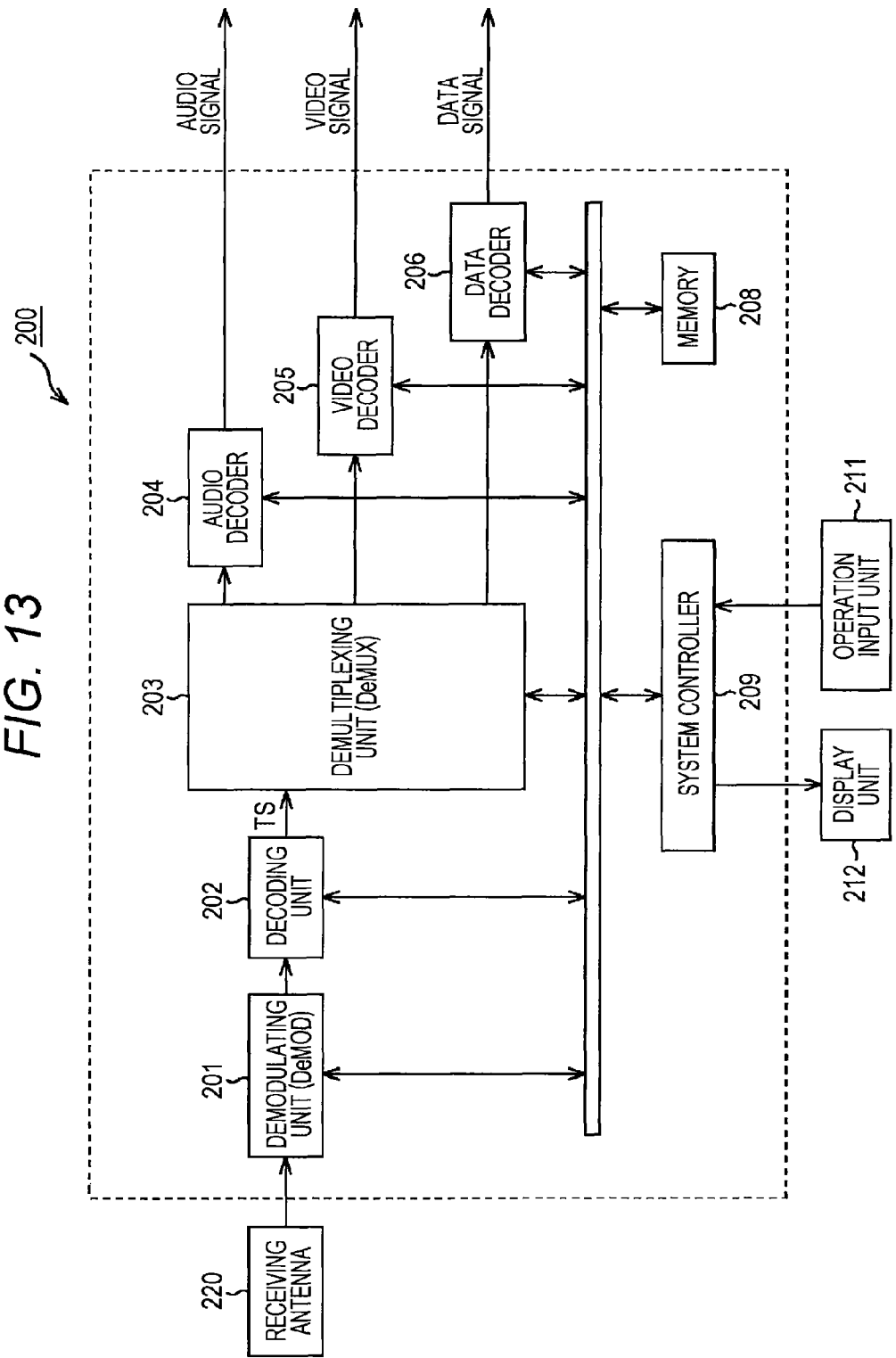
FIG. 13 is a block diagram showing an embodiment of a reception device to which the present invention is applied.

In the reception device 200 shown in FIG. 13, a receiving antenna 220 receives a terrestrial broadcast signal transmitted from the transmission device 100. A demodulating unit 201 performs a digital demodulating operation on the broadcast signal received by the receiving antenna 220. A decoding unit 202 performs decoding by performing deinterleaving and error correction on the signal subjected to the digital demodulating operation by the demodulating unit 201, and extracts transport streams.

Based on the PID (packet identification number) written in the TS packets in the transport streams input from the decoding unit 202, a demultiplexing unit 203 extracts each TS packet, and determines whether the digital data contained in each TS packet belongs to an audio signal or to a video signal. The demultiplexing unit 203 then outputs the digital data belonging to an audio signal to an audio decoder 204, outputs the digital data belonging to a video signal to a video decoder 205, and outputs the digital data belonging to a data signal to a data decoder 206.

The demultiplexing unit 203 also extracts the control information (PSI/SI) such as an NIT, an SDT (Service Description Table), or a BAT (Bouquet Association Table) contained in the transport streams, and outputs each piece of information contained in the PSI/SI to a system controller 209.

The audio decoder 204, the video decoder 205, and the data decoder 206 perform decoding on the digital data input from the demultiplexing unit 203, to generate an audio signal, a video signal, and a data signal. When sound broadcasting carrying only sound information is received, the video decoder 205 and the data decoder 206 may not be provided in the reception device 200.

A memory 208 stores the control information (PSI/SI) contained in the transport streams. The memory 208 can be formed with any type of rewritable semiconductor memory, and may be detachably attached to the reception device 200, for example.

The system controller 209 exchanges various kinds of signals with the respective components of the reception device 200, to control operations of the respective components of the reception device 200. The system controller 209 also extracts information contained in the PSI/SI, such as an NIT, an SDT, or a BAT, which has been input from the demultiplexing unit 203, and stores the extracted information into the memory 208.

An operation input unit 211 receives various kinds of operations (inputs) performed on this reception device 200 by a user, such as an reception start instruction, a service switch instruction, or setting of a service number. A display unit 212 is formed with a liquid crystal display device, for example, and displays data, such as a service number, a service name, and additional information, to the user.

A receiving operation of the reception device 200 having the above described structure is now briefly described.

First, the receiving antenna 220 receives a broadcast signal transmitted from the transmission device 100. The demultiplexing unit 203 extracts the control information (PSI/SI) such as an NIT containing a connected transmission descriptor from the transport streams obtained through demodulation after the reception by the receiving antenna 220, and outputs the control information to the system controller 209.

Based on the connected transmission descriptor contained in the NIT, the system controller 209 performs control so as to receive a desired transmission channel. Specifically, when transmission channels to be received are switched, it is possible to obtain information indicating whether the transmission channel received prior to the switching and the transmission channel to be received after the switching have been subjected to connected transmission. Where the transmission channel received prior to the switching and the transmission channel to be received after the switching have been subjected to connected transmission, the system controller 209 can continue to use the synchronizing timing set in the transmission channel received prior to the switching, in the transmission channel to be received after the switching. Accordingly, the synchronization regenerating operation for demodulation can be simplified, and the channel switching time can be shortened.

The above described series of operations can be performed by hardware, and can also be performed by software. When the series of operations are to be performed by software, the programs forming the software are installed in a computer. Here, the computer may be a computer incorporated into special-purpose hardware, or may be a general-purpose personal computer that can execute various kinds of functions as various kinds of programs are installed thereinto.

Figure 14:
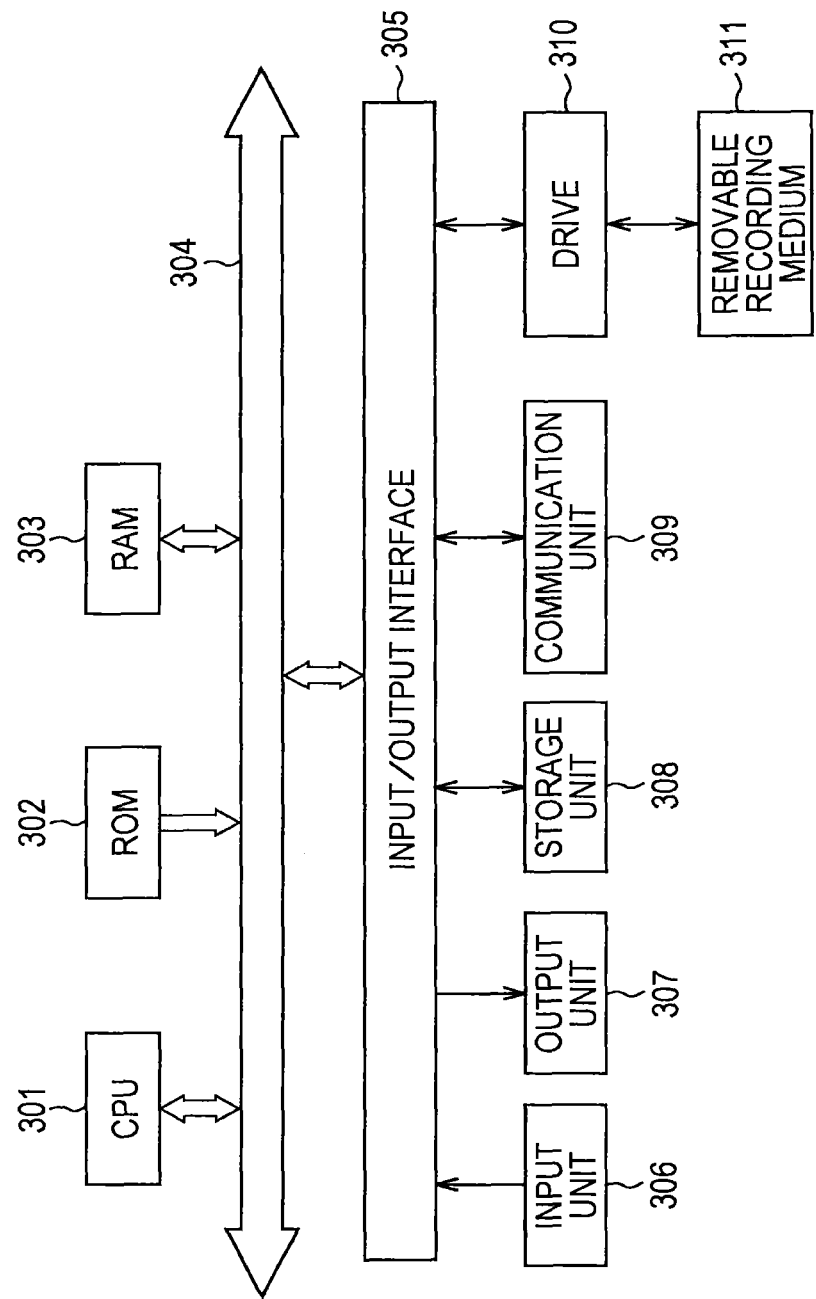
FIG. 14 is a block diagram showing an example structure of an embodiment of a computer to which the present invention is applied.

FIG. 14 is a block diagram showing an example structure of the hardware of a computer that performs the above described series of operations in accordance with programs.

In the computer, a CPU (Central Processing Unit) 301, a ROM (Read Only Memory) 302, and a RAM (Random Access Memory) 303 are connected to one another by a bus 304.

An input/output interface 305 is further connected to the bus 304. An input unit 306, an output unit 307, a storage unit 308, a communication unit 309, and a drive 310 are connected to the input/output interface 305.

The input unit 306 is formed with a keyboard, a mouse, a microphone, and the like. The output unit 307 is formed with a display, a speaker, and the like. The storage unit 308 is formed with a hard disk, a nonvolatile memory, or the like. The communication unit 309 is formed with a network interface or the like. The drive 310 drives a removable recording medium 311 such as a magnetic disk, an optical disk, a magnetooptical disk, or a semiconductor memory.

In the computer having the above described structure, the CPU 301 loads a program stored in the storage unit 308 into the RAM 303 via the input/output interface 305 and the bus 304, and executes the program, so that the above described series of operations are performed.

The programs to be executed by the computer (the CPU 301) may be recorded on the removable recording medium 311 as a package medium to be provided, for example. Alternatively, the programs can be provided via a wired or wireless transmission medium such as a local area network, the Internet, or digital satellite broadcasting.

The programs to be executed by the computer may be programs for performing operations in chronological order in accordance with the sequence described in this specification, or may be programs for performing operations in parallel or performing an operation when necessary, such as when there is a call.

Embodiments of the present invention are not limited to the above described embodiments, and various modifications may be made to them without departing from the scope of the invention.

For example, broadcast signals compatible with the connected transmission method according to the present invention are not limited to those transmitted as terrestrial signals from broadcast stations, and may also be those transmitted via satellite waves, a CATV (Cable Television) network, or the like. Also, broadcast signals may be transmitted by multicasting like IPTV (Internet Protocol Television), for example. In this case, a web server is equivalent to the transmission device of the present invention, and a personal computer having a network interface such as an NIC (Network Interface Card) is equivalent to the reception device of the present invention.

REFERENCE SIGNS LIST

100 Transmission device, 101a Source encoders, 102 OFDM transmission device, 104 System control device, 200 Reception device, 203 Demultiplexing unit, 209 System controller

The invention claimed is:

1. A transmission device for transmitting connected transmission information indicating that connected transmission of a plurality of transmission channels
which have transmission data in a combination of plurality of segment formats which are different from each other is being performed,
the connected transmission information including a field for specifying a modulation method type of each of three or more layers of layered transmission that can be performed on at least one of the plurality of transmission channels in the three or more layers, wherein a value indicating that transmission is not to be performed in a second or later layer other than a first layer of the three or more layers is stored in the field for specifying the modulation method type of the layer in which transmission is not to be performed.

2. The transmission device according to claim 1, wherein
the connected transmission information is transmitted in the form of a connected transmission descriptor as control information for transport streams, and
the transmission device modulates the plurality of transport streams corresponding to the plurality of transmission channels by orthogonal frequency division multiplexing (OFDM), synchronizes a plurality of OFDM signals corresponding to the plurality of transmission channels in a direction of a time axis, the plurality of OFDM signals being obtained as a result of the modulation, further multiplexes the plurality of OFDM signals in a frequency direction, and transmits the multiplexed signals.

3. The transmission device according to claim 1, wherein at least one of the plurality of transmission channels is a transmission channel in a 13-segment format.

4. The transmission device according to claim 1, wherein at least one of the plurality of transmission channels is being subjected to layered transmission in three or more layers.

5. The transmission device according to claim 4, wherein at least one of the plurality of transmission channels is being subjected to layered transmission in three layers.

6. The transmission device according to claim 1, wherein one of the transmission channels being subjected to connected transmission other than the one transmission channel that can be subjected to the layered transmission in the three or more layers is being transmitted in two layers or less.

7. The transmission device according to claim 6, wherein one of the transmission channels being subjected to connected transmission other than the one transmission channel that can be subjected to the layered transmission in the three or more layers is being transmitted in one layer.

8. The transmission device according to claim 1, wherein the number of segments of the plurality of transmission channels being subjected to connected transmission is 33.

9. The transmission device according to claim 1, wherein a value indicating differential modulation or synchronous modulation is stored in the field for specifying a modulation method type of a first layer that is one of the three or more layers.

10. The transmission device according to claim 1, wherein the field for specifying the modulation method type of a first layer that is one of the three or more layers is shown with 2-bit information of "00" when the modulation method type is differential modulation, and with 2-bit information of "01" when the modulation method type is synchronous modulation.

11. The transmission device according to claim 1, wherein the field for specifying the modulation method type of a second or later layer, that is one of the three or more layers, in which transmission is not to be performed is shown with 2-bit information of "10".

12. The transmission device according to claim 1, wherein the transmission device transmits information indicating that transmission is not to be performed in a predetermined layer among the three or more layers.

13. A transmission method of a transmission device for transmitting connected transmission information indicating that connected transmission of a plurality of transmission channels which have transmission data in a combination of plurality of segment formats which are different from each other is being performed, the connected transmission information including a field that specifies a modulation method type of each of three or more layers of layered transmission that can be performed on at least one of the plurality of transmission channels in the three or more layers, wherein a value indicating that transmission is not to be performed in a second or later layer other than a first layer of the three or more layers is stored in the field for specifying the modulation method type of the layer in which transmission is not to be performed.

14. A reception device for receiving connected transmission information indicating that connected transmission of a plurality of transmission channels which have transmission data in a combination of plurality of segment formats which are different from each other is being performed, the connected transmission information including a field that specifies a modulation method type of each of three or more layers of layered transmission that can be performed on at least one of the plurality of transmission channels in the three or more layers, wherein a value indicating that transmission is not to be performed in a second or later layer other than a first layer of the three or more layers is stored in the field for specifying the modulation method type of the layer in which transmission is not to be performed.

15. The reception device according to claim 14, wherein
the connected transmission information is received in the form of a connected transmission descriptor as control information for transport streams, and
signals of the transport streams are generated by modulating the plurality of transport streams corresponding to the plurality of transmission channels by orthogonal frequency division multiplexing (OFDM), synchronizing a plurality of OFDM signals that are obtained as a result of the modulation and correspond to the plurality of transmission channels in a direction of a time axis, and further multiplexing the plurality of OFDM signals in a frequency direction.

16. The reception device according to claim 14, wherein, based on the connected transmission information, control is performed to receive a desired transmission channel.

17. A transmission device for transmitting connected transmission information indicating that connected transmission of a plurality of transmission channels is being performed, the connected transmission information including a field that specifies a modulation method of each of three or more layers of layered transmission that can be performed on at least one of the plurality of transmission channels in the three or more layers, wherein the field for specifying the modulation method type of a second or later layer, that is one of the three or more layers, in which transmission is not to be performed is shown with 2-bit information of "10".

18. A transmission device for transmitting connected transmission information indicating that connected transmission of a plurality of transmission channels is being performed, the connected transmission information including a field for specifying a modulation method type of each of three or more layers of layered transmission that can be performed on at least one of the plurality of transmission channels in the three or more layers, wherein a value indicating differential modulation or synchronous modulation is stored in the field for specifying a modulation method type of a first layer that is one of the three or more layers, wherein a value indicating that transmission is not to be performed in a second or later layer other than the first layer of the three or more layers is stored in the field for specifying the modulation method type of the layer in which transmission is not to be performed.

19. A reception device for receiving connected transmission information indicating that connected transmission of a plurality of transmission channels is being performed, the connected transmission information including a field that specifies a modulation method type of each of three or more layers of layered transmission that can be performed on at least one of the plurality of transmission channels in the three or more layers, wherein a value indicating differential modulation or synchronous modulation is stored in the field for specifying a modulation method type of a first layer that is one of the three or more layers, wherein a value indicating that transmission is not to be performed in a second or later layer other than the first layer of the three or more layers is stored in the field for specifying the modulation method type of the layer in which transmission is not to be performed.

* * * * *